United States Patent
Erceg et al.

(10) Patent No.: US 8,254,931 B2
(45) Date of Patent: Aug. 28, 2012

(54) METHOD AND SYSTEM FOR COMMUNICATION BETWEEN A PLURALITY OF FEMTOCELLS TO MITIGATE INTERFERENCE BETWEEN THE FEMTOCELLS

(75) Inventors: Vinko Erceg, Cardiff, CA (US); Charles Abraham, Los Gatos, CA (US); Xuemin Chen, Rancho Santa Fe, CA (US); Wael William Diab, San Francisco, CA (US); Victor T Hou, LaJolla, CA (US); Jeyhan Karaoguz, Irvine, CA (US); Mark Kent, Vista, CA (US)

(73) Assignee: Broadcom Corporation, Irvine, CA (US)

( * ) Notice: Subject to any disclaimer, the term of this patent is extended or adjusted under 35 U.S.C. 154(b) by 598 days.

(21) Appl. No.: 12/415,844

(22) Filed: Mar. 31, 2009

(65) Prior Publication Data
US 2010/0246483 A1 Sep. 30, 2010

(51) Int. Cl.
*H04W 36/00* (2009.01)
(52) U.S. Cl. .... 455/436; 455/444; 455/41.2; 455/114.2; 370/336
(58) Field of Classification Search .................. 455/436, 455/443, 444–454, 41.1, 41.2; 370/336
See application file for complete search history.

(56) References Cited

U.S. PATENT DOCUMENTS

| | | | |
|---|---|---|---|
| 2008/0261602 A1* | 10/2008 | Livneh | 455/442 |
| 2010/0027694 A1* | 2/2010 | Touboul et al. | 375/260 |
| 2010/0118844 A1* | 5/2010 | Jiao et al. | 370/338 |
| 2010/0120438 A1* | 5/2010 | Kone et al. | 455/444 |
| 2010/0157911 A1* | 6/2010 | Hegde et al. | 370/329 |

* cited by examiner

*Primary Examiner* — Jean Gelin
*Assistant Examiner* — Michael Nguyen
(74) *Attorney, Agent, or Firm* — Sterne, Kessler, Goldstein & Fox P.L.L.C.

(57) ABSTRACT

Aspects of a method and system for communication between a plurality of femtocells to mitigate interference between the femtocells are provided. In this regard, a first of a plurality of femtocells in a network may receive interference information from one or more other femtocells, one or more base stations, and/or one or more communication devices in the network. The first femtocell may determine configuration information for the first femtocell and one or more other femtocells in the network based on the communicated interference information. The first femtocell and the other femtocells in the network may be configured based on the determined configuration information. The interference between the plurality of femtocells may be mitigated based on configuring the first femtocell and the other femtocells in the network based on the determined configuration information.

18 Claims, 4 Drawing Sheets

METHOD AND SYSTEM FOR COMMUNICATION BETWEEN A PLURALITY OF FEMTOCELLS TO MITIGATE INTERFERENCE BETWEEN THE FEMTOCELLS

CROSS-REFERENCE TO RELATED APPLICATIONS/INCORPORATION BY REFERENCE

Not Applicable

FIELD OF THE INVENTION

Certain embodiments of the invention relate to communications. More specifically, certain embodiments of the invention relate to a method and system for communication between a plurality of femtocells to mitigate interference between the femtocells.

BACKGROUND OF THE INVENTION

A femtocell is a small base station that may be placed in a customer's residence or in a small business environment, for example. Femtocells may be utilized for off-loading macro radio network facilities, improving coverage locally in a cost-effective manner, and/or implementing home-zone services to increase revenue. Femtocells, like macro base stations, may be enabled to connect "standard" phones to a cellular provider's network by a physical broadband connection which may be a digital subscriber line (DSL) connection, fiber connection, and/or a cable connection, for example. Since the traffic between a customer's premises femtocell equipment and the operator's network may be traversing a public network, the traffic may be prone to various risks.

Communication between femtocells and one or more cellular provider's networks enables operation in private and public areas. The capacity of a femtocell may be adequate to address a typical family use model supporting two to four simultaneous voice calls and/or data, for example.

An important characteristic of femtocells is their ability to control access. In an open access scenario, any terminal and/or subscriber that may be subscribed to any cellular base station may be allowed to communicate with the femtocell. Accordingly, the femtocell usage may somewhat resemble that of a macrocellular system. In a closed access scenario, only a limited number of terminals and/or subscribers that may be subscribed to a given cellular base station may be allowed to communicate with the femtocell. In this regard, the cellular base station may be perceived as being deployed for private usage.

A regulatory issue with regard to femtocells is that they use licensed frequencies that radiate at a very low power in a controlled environment. It may be likely that they may not require a license from a local authority, as macrocellular base stations do. An additional regulatory issue may arise from the relationship between a femtocell operator and a broadband services operator. One possible scenario may include the broadband operator being unaware of the existence of a femtocell operator. Conversely, the broadband operator and femtocell operator may have an agreement or they may be the same operator, for example. Interference between femtocells may be an issue for femtocell deployments based on wideband technologies such as WCDMA or OFDM, for example, because initial operator deployments may use the same frequency for both the femtocell and the macrocellular networks or due to the proximity of femtocell base stations in dense urban areas There are a plurality of design models for deployment and integration of femtocells, for example, an IP based radio network controller (RNC) node B (Iu-b), a session initiation protocol (SIP) based approach using an Iu/A interface, use of unlicensed spectrum in a technique known as unlicensed mobile access (UMA) and/or use of IP multimedia subsystem (IMS) voice call continuity (VCC), for example.

In an Iu-b model based femtocell deployment approach, femtocells may be fully integrated into the wireless carrier's network and may be treated like any other remote node in a network. The Iu-b protocol may have a plurality of responsibilities, such as the management of common channels, common resources, and radio links along with configuration management, including cell configuration management, measurement handling and control, time division duplex (TDD) synchronization, and/or error reporting, for example. In Iu-b configurations, mobile devices may access the network and its services via the Node B link, and femtocells may be treated as traditional base stations.

In a SIP based femtocell deployment approach, a SIP client, embedded in the femtocell may be enabled to utilize SIP to communicate with the SIP-enabled mobile switching center (MSC). The MSC may perform the operational translation between the IP SIP network and the traditional mobile network, for example.

In a UMA based femtocell deployment approach, a generic access network (GAN) may offer an alternative way to access GSM and GPRS core network services over broadband. To support this approach, a UMA Network Controller (UNC) and protocols that guarantee secure transport of signaling and user traffic over IP may be utilized. The UNC may be enabled to interface into a core network via existing 3GPP interfaces, for example, to support core network integration of femtocell based services by delivering a standards based, scalable IP interface for mobile core networks.

In an IMS VCC based femtocell deployment approach, VCC may provide for a network design that may extend an IMS network to include cellular coverage and address the handoff process. The IMS VCC may be designed to provide seamless call continuity between cellular networks and any network that supports VoIP, for example. The VCC may also provide for interoperability between GSM, UMTS, and CDMA cellular networks and any IP capable wireless access network, for example. The IMS VCC may also support the use of a single phone number or SIP identity and may offer a broad collection of functional advantages, for example, support for multiple markets and market segments, provisioning of enhanced IMS multimedia services, including greater service personalization and control, seamless handoff between circuit-switched and IMS networks, and/or access to services from any IP device.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for communication between a plurality of femtocells to mitigate interference between the femtocells, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for communication between a plurality of femtocells to mitigate interference between the femtocells. In various exemplary embodiments of the invention, a first of a plurality of femtocells in the network may receive interference information from one or more other femtocells, one or more base stations, and/or one or more communication devices in the network. The first femtocell may determine configuration information for the first femtocell and one or more other femtocells in the network based on the communicated interference information. The first femtocell and the other femtocells in the network may be configured based on the determined configuration information. The determined configuration information may comprise one or more of power levels, frequencies of operation, and/or directionality of antennas of each of the plurality of femtocells. The interference between the plurality of femtocells may be mitigated based on configuring the first femtocell and the other femtocells in the network based on the determined configuration information. The determined configuration information may comprise one or more of power levels, frequencies of operation, location, and/or directionality of antennas of each of the plurality of femtocells.

Figure 1A:
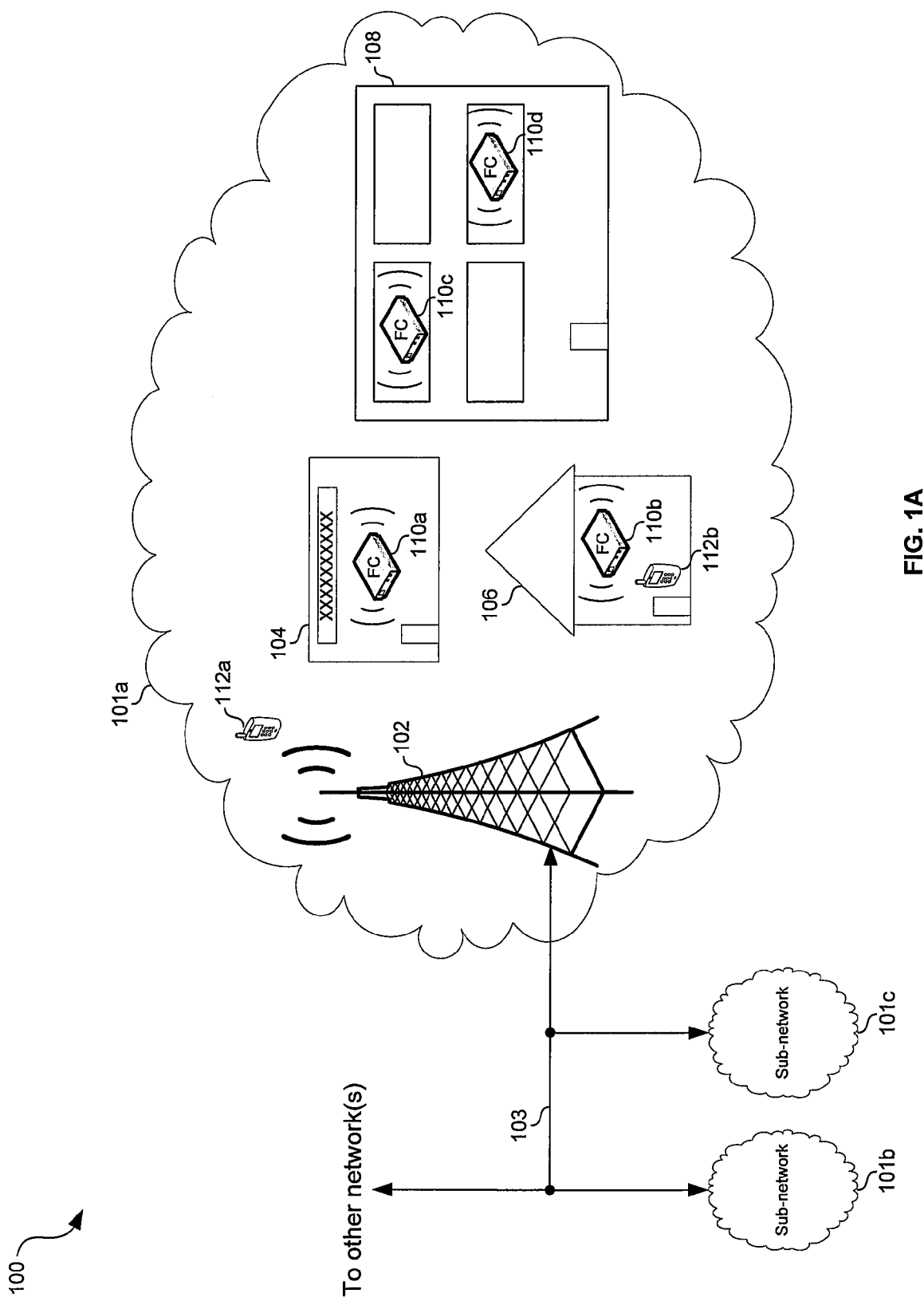
FIG. 1A is a diagram illustrating an exemplary cellular network, in accordance with an embodiment of the invention.

FIG. 1A is a diagram illustrating an exemplary cellular network, in accordance with an embodiment of the invention. Referring to FIG. 1A, there is shown a cellular network 100 comprising sub-networks 101a, 101b and 101c. The exemplary sub-network 101a may comprise a base station 102, femtocells 110a, 110b, 110c and 110d, which are collectively referred to herein as femtocells 110, and cellular enabled communication devices 112a and 112b, which are collectively referred to herein as cellular enabled communication devices 112. The femtocells 110 may be installed in one or more commercial properties 104, one or more residential properties 106, and/or one or more multi-tenant properties 108.

The commercial properties 104 may comprise, for example, stores, restaurants, offices, and municipal buildings. The residential properties 106 may comprise, for example, single-family homes, home offices, and/or town-houses. Multi-tenant properties 108 may comprise residential and/or commercial tenants such as apartments, condos, hotels, and/or high rises.

The base station 102 may be operable to communicate data wirelessly utilizing one or more wireless standards such as IS-95, CDMA, GSM, TDMA, GPRS, EDGE, UMTS/WCDMA, TD-SCDMA, OFDM, HSDPA, Bluetooth, WLAN, WiMAX, ZigBee extensions thereto, and/or variants thereof. Notwithstanding, the invention may not be so limited, and the base station 102 may be operable to communicate data to the plurality of femtocells via a wired network, for example, a digital subscriber line (DSL) connection, fiber connection, and/or a cable connection without limiting the scope of the invention. "Data," as utilized herein, may refer to any analog and/or digital information including but not limited to voice, Internet data, and/or multimedia content. Multimedia content may comprise audio and/or visual content comprising, video, still images, animated images, and/or textual content. The base station 102 may communicate with the cellular enabled communication devices such as the cellular enabled communication devices 112. Exemplary cellular standards supported by the base station 102 may be specified in the International Mobile Telecomunnications-2000 (IMT-2000) standard and/or developed by the $3^{rd}$ generation partnership project (3GPP) and/or the $3^{rd}$ generation partnership project 2 (3GPP2). The base station 102 may communicate data amongst the various components of the sub-network 101a. Additionally, data communicated to and/or from the base station 102 may be communicated to sub-network 101b, sub-network 101c, and/or to one or more other networks (not shown) via one or more backhaul links 103. In this manner, data communicated to and/or from the base station 102 may be communicated to and/or from, other portions of the network 100 and/or other networks. Exemplary networks with which data may be communicated may comprise public switched telephone networks (PSTN) and/or IP networks such as the Internet or an intranet.

The femtocells 110 may each comprise suitable logic, circuitry, and/or code that may be operable to communicate wirelessly utilizing one or more wireless standards such as IS-95, CDMA, GSM, TDMA, GPRS, EDGE, UMTS/WCDMA, TD-SCDMA, OFDM, HSDPA, Bluetooth, WLAN, WiMAX, ZigBee extensions thereto, and/or variants thereof. In this regard, the femtocells 110 may each communicate with the cellular enabled communication devices such as the cellular enabled communication devices 112. Exemplary cellular standards supported by the femtocells 110 may be specified in the International Mobile Telecomunnications-2000 (IMT-2000) standard and/or developed by the $3^{rd}$ generation partnership project (3GPP) and/or the $3^{rd}$ generation partnership project 2 (3GPP2). Additionally, the femtocells 110 may each comprise suitable logic, circuitry, and/or code that may be operable to communicate over an IP network (not shown in FIG. 1A).

The cellular enabled communication devices 112 may each comprise suitable logic, circuitry, and/or code that may be operable to communicate utilizing one or more cellular standards. In this regard, the cellular enabled communication devices 112 may each be operable to transmit and/or receive data via the cellular network 100. Exemplary cellular enabled communication devices may comprise laptop computers, mobile phones, and personal media players, for example. The cellular enabled communication devices 112 may be enabled to receive, process, and present multimedia content and may additionally be enabled run a network browser or other applications for providing Internet services to a user of the cellular enabled device 112.

In operation, the cellular enabled communication devices 112 may gain access to the cellular network 100 and/or to other communication networks via cellular communications with the base station 102 and/or the femtocells 110. In this regard, in instances that a reliable connection may be established between the base station 102 and a cellular enabled communication device 112, the data may be communicated between the cellular enabled communication device 112 and the base station 102. Alternatively, in instances that a reliable connection may be established between a femtocell 110 and a cellular enabled communication device 112, the data may be communicated between the cellular enabled communication device 112 and the femtocell 110. However, because of the finite number of cellular channels and limited availability and cost of licensing cellular frequencies, there may be a significant risk for interference between two or more of the femtocells 110 and/or between one or more femtocells 110 and the base station 102. Thus, owners and/or operators (owners/operators) of the femtocells 110 may desire and/or need a way to mitigate the cellular interference caused by the femtocells 110 in the cellular network 100.

In accordance with an embodiment of the invention, the plurality of femtocells, for example, femtocells 110a, 110b, 110c and 110d within the cellular sub-network 101a may be interconnected via a wired and/or wireless connection, for example. Each of the plurality of femtocells 110a, 110b, 110c and 110d may be operable to communicate and/or exchange interference information between each other. For example, each of the femtocells 110b, 110c and 110d may be operable to communicate interference information to femtocell 110a. The communicated interference information may comprise one or more of signal to noise ratio (SNR), signal to interference noise ratio (SINR), carrier to noise ratio (CNR), carrier to interference noise ratio (CINR), receive signal strength indication (RSSI), potential interference, power levels, and/or directionality of antennas of each of the plurality of femtocells 110b, 110c and 110d.

The femtocell 110a may be operable to determine configuration information for itself and the other femtocells 110b, 110c and 110d based on the communicated interference information. The determined configuration information may comprise one or more of power levels, frequencies of operation, location, and/or directionality of antennas of each of the plurality of femtocells 110b, 110c and 110d.

The femtocell 110a may be operable to configure itself based on the determined configuration information. The femtocell 110a may be operable to communicate the determined configuration information for one or more other femtocells 110b, 110c and 110d to corresponding ones of the one or more other femtocells 110b, 110c and 110d. The one or more other femtocells 110b, 110c and 110d may be operable to utilize the communicated determined configuration information to configure corresponding ones of the one or more other femtocells 110b, 110c and 110d. The interference between the plurality of femtocells 110a, 110b, 110c and 110d may be mitigated based on the configuring of the first femtocell 110a and the configuring of the corresponding ones of the one or more other femtocells 110b, 110c and 110d.

Figure 1B:
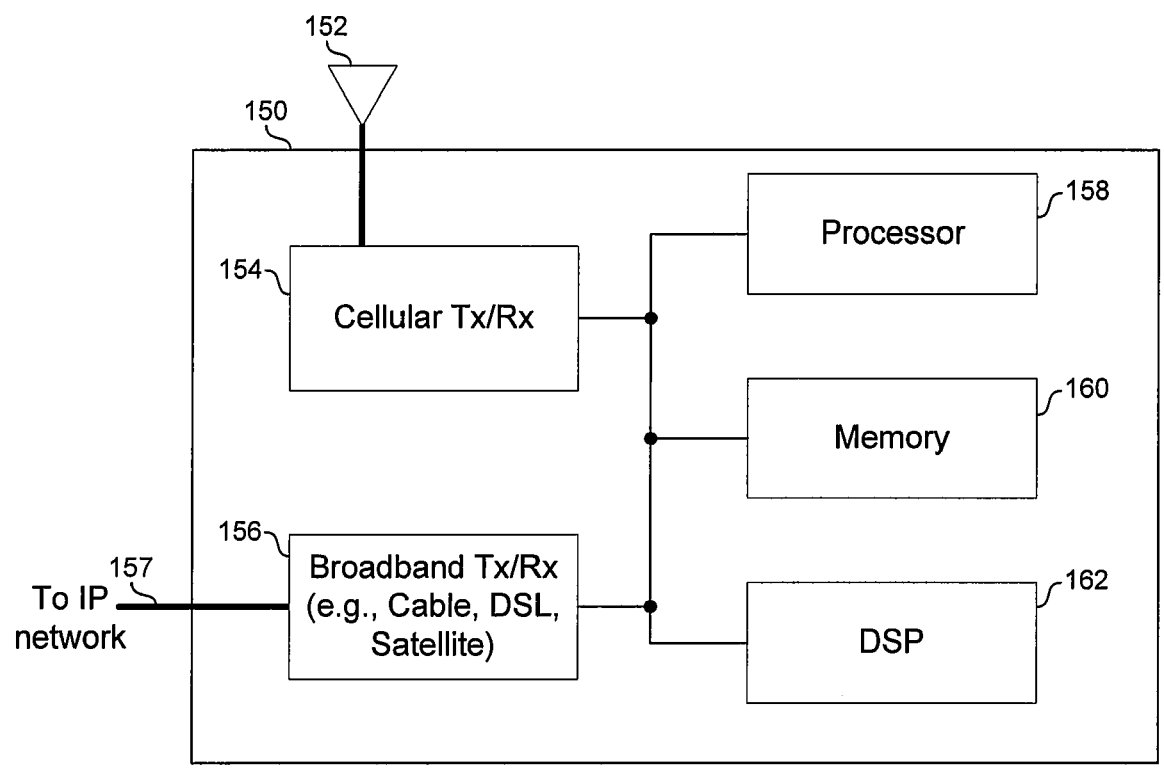
FIG. 1B is a block diagram of an exemplary femtocell, in accordance with an embodiment of the invention.

FIG. 1B is a block diagram of an exemplary femtocell, in accordance with an embodiment of the invention. Referring to FIG. 1B, there is shown a femtocell 150 comprising an antenna 152, a cellular transmitter and/or receiver (Tx/Rx) 154, a broadband transmitter and/or receiver (Tx/Rx) 156, a processor 158, a memory 160, and a digital signal processor (DSP) 162. The femtocell 150 may be similar to or the same as the femtocells 110 described with respect to FIG. 1A. The femtocell 150 may be part of a mesh network of interconnected femtocells, for example, and may be connected to other femtocells or an IP network via a wired and/or wireless connection.

The antenna 152 may be suitable for transmitting and/or receiving cellular signals. Although a single antenna is illustrated, the invention may not be so limited. In this regard, the cellular Tx/Rx 154 may utilize a common antenna for transmission and reception, or may utilize different antennas for transmission and reception, and/or may utilize a plurality of antennas for transmission and/or reception.

The cellular Tx/Rx 154 may comprise suitable logic circuitry and/or code that may be operable to transmit and/or receive voice and/or data utilizing one or more cellular standards. The cellular Tx/Rx 154 may be operable to perform amplification, down-conversion, filtering, demodulation, and analog to digital conversion of received cellular signals. The cellular Tx/Rx 154 may be operable to perform amplification, up-conversion, filtering, modulation, and digital to analog conversion of transmitted cellular signals. The cellular Tx/Rx 154 may support communication over a plurality of communication channels utilizing time division multiple access (TDMA), code division multiple access (CDMA) and/or orthogonal frequency division multiplexing (OFDM). Exemplary cellular standards supported by the femtocells 110 may be specified in the International Mobile Telecomunnications-2000 (IMT-2000) standard developed by the $3^{rd}$ generation partnership project (3GPP) and/or the $3^{rd}$ generation partnership project 2 (3GPP2). The cellular Tx/Rx 154 may be operable to transmit and/or receive on one or more frequencies and/or channels. One or more of the frequencies and/or one or more of the channels on which the cellular Tx/Rx 154 receives and/or transmits may be configured via one or more control signals from the processor 158, memory 160, and/or the DSP 162. The cellular Tx/Rx 154 may also comprise a processor that may be enabled to monitor the received signal strength and for characterizing an environment in which the femtocell 150 resides.

The broadband Tx/Rx 156 may comprise suitable logic, circuitry, and/or code that may be operable to transmit voice and/or data in adherence to one or more broadband standards. The broadband Tx/Rx 156 may be operable to perform amplification, down-conversion, filtering, demodulation, and analog to digital conversion of received signals. The broadband Tx/Rx 156 may be operable to perform amplification, up-conversion, filtering, modulation, and digital to analog conversion of transmitted signals. In various exemplary embodiments of the invention, the broadband Tx/Rx 156 may transmit and/or receive voice and/or data over the link 157 which may be a T1/E1 line, optical fiber, DSL, cable television infrastructure, satellite broadband internet connection, satellite television infrastructure, and/or Ethernet. In various exemplary embodiments of the invention, data received via the broadband Tx/Rx 156 may be conveyed to the processor 158, memory 160, and/or the DSP 162 and may be utilized to control one or more frequencies and/or channels on which the cellular Tx/Rx 154 transmits and/or receives.

The processor 158 may comprise suitable logic, circuitry, and/or code that may enable processing data and/or controlling operations of the femtocell 150. In this regard, the processor 158 may be enabled to provide control signals to the various other blocks comprising the femtocell 150. The processor 158 may also control data transfers between various portions of the femtocell 150. Additionally, the processor 158 may enable execution of applications programs and/or code. In various embodiments of the invention, the applications, programs, and/or code may enable, for example, parsing, transcoding, or otherwise processing data. In various embodiments of the invention, the applications, programs, and/or code may enable, for example, configuring or controlling operation of the cellular Tx/Rx 154, the broadband Tx/Rx 156, the DSP 162, and/or the memory 160. In various embodiments of the invention, the applications, programs, and/or code may enable detecting interference and/or controlling cellular one or more frequencies and/or one or more channels on which the cellular Tx/Rx 154 transmits and/or receives.

The processor 158 may be operable to receive data at the femtocell 150 within the network from a source, for example, a base station 146, an IP network 132, a cellular enabled communication device 138a and/or another femtocell, for example, femtocell 110a within a coverage area of the femtocell 150. The processor 158 in the femtocell 110a may be operable to receive interference information from the plurality of femtocells 110b, 110c and 110d. The processor 158 may be operable to determine configuration information for each of the femtocells 110a, 110b, 110c and 110d based on the received interference information. In accordance with another embodiment of the invention, each femtocell may be operable to configure itself based on the received interference information from the other femtocells in its vicinity. The determined configuration information may comprise one or more of power levels, frequencies of operation, location, and/or directionality of antennas of each of the plurality of femtocells, for example, femtocells 110a, 110b, 110c and 110d. The processor 158 may be operable to configure each of the femtocells 110a, 110b, 110c and 110d utilizing the received determined configuration information.

The memory 160 may comprise suitable logic, circuitry, and/or code that may enable storage or programming of information that includes parameters and/or code that may effectuate the operation of the femtocell 150. The parameters may comprise configuration data and the code may comprise operational code such as software and/or firmware, but the information need not be limited in this regard. Moreover, the parameters may include adaptive filter and/or block coefficients. Additionally, the memory 160 may buffer or otherwise store received data and/or data to be transmitted. In various embodiments of the invention, the memory 160 may comprise one or more look-up tables utilized for determining cellular devices within a coverage area of the femtocell 150. In various embodiments of the invention, the memory 160 may comprise one or more look-up tables or other data structures which may comprise information controlling one or more frequencies and/or one or more channels on which the cellular Tx/Rx 154 transmits and/or receives.

The DSP 162 may comprise suitable logic, circuitry, and/or code operable to process audio and/or video signals. In various embodiments of the invention, the DSP 162 may encode, decode, modulate, demodulate, encrypt, and/or decrypt voice and/or data signals. In this regard, the DSP 162 may be operable to perform computationally intensive processing of voice and/or data signals. In various embodiments of the invention, the DSP 162 may be operable to detect interference and/or control one or more frequencies and/or one or more channels on which the cellular Tx/Rx 154 transmits and/or receives. The DSP 162 may be operable to perform, for example, fast Fourier transform analysis (FFT) of received signals to characterize radio environment in which the femtocell 150 resides.

In an exemplary embodiment of the invention, the femtocell 150 may characterize its environment by receiving signals on one or more frequencies and/or channels via the cellular Tx/Rx 154, conveying the received signals to the DSP 162, and performing one or more measurements and/or calculations on the signals via the DSP 162. In this regard, the DSP may characterize received signals utilizing metrics such as in-band interference, out-of-band interference, and/or signal-to-noise ratio (e.g. SNR, SINR, CNR). The characterization may enable detection of interfering signals. Results of the characterization may be conveyed to the processor 158 and/or stored in the memory 160 and may be utilized, at least in part, to determine one or more frequencies and/or channels on which the cellular Tx/Rx 154 may transmit and/or receive. In this manner, interference may be reduced. The results of the characterization may be communicated over, for example, an IP network to which the femtocell 150 is communicatively coupled via the broadband Tx/Rx 156.

The one or more frequencies and/or channels on which the cellular Tx/Rx 154 may transmit and/or receive may also be determined, at least in part, based on data received via the broadband Tx/Rx 156. In this regard, other femtocells and/or base stations may characterize the environment in which they are operating and may communicate results of those characterizations over, for example, an IP network to which the femtocell 150 is communicatively coupled. In various embodiments of the invention, characterizing an environment may comprise measuring signal strengths on one or more frequencies and/or channels and perform one or more calculations and/or analyses utilizing the measurements. In this manner, signals which may interfere with cellular communications with the femtocell 150 may be detected.

Figure 2:
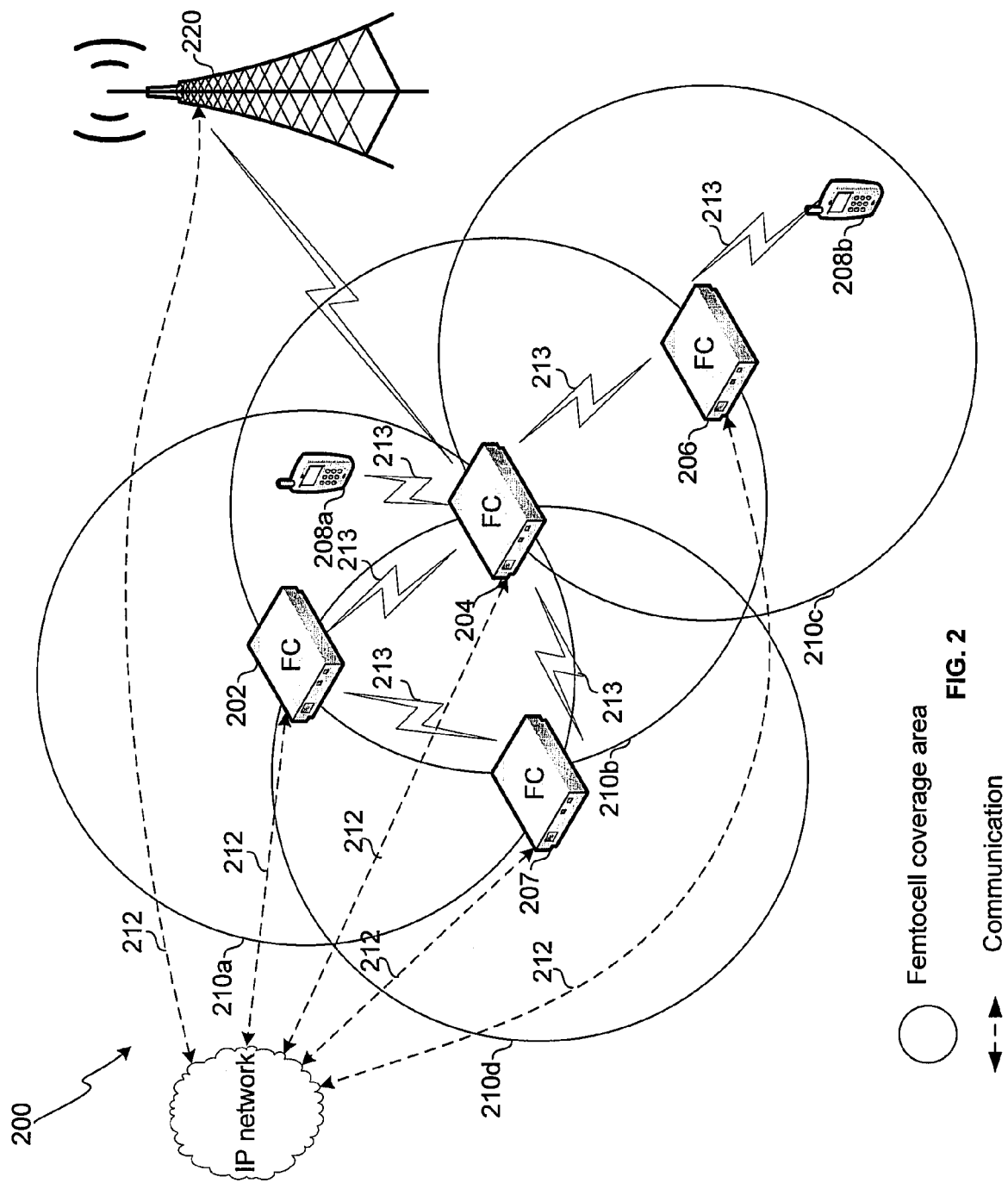
FIG. 2 is a diagram illustrating communication between a plurality of femtocells to mitigate interference between the femtocells, in accordance with an embodiment of the invention.

FIG. 2 is a diagram illustrating communication between a plurality of femtocells to mitigate interference between the femtocells, in accordance with an embodiment of the invention. Referring to FIG. 2, there is shown a network 200. The network 200 may comprise a base station 220, a plurality of femtocells 202, 204, 206 and 207, and a plurality of cellular enabled communication devices 208a and 208b. The plurality of femtocells 202, 204, 206 and 207 and the base station 220 may be communicatively coupled to an IP network via a wired connection 212. The plurality of femtocells 202, 204, 206 and 207, and the plurality of cellular enabled communication devices 208a and 208b may be communicatively coupled via wireless connections 213. The base station 220 may be may be substantially as described with respect to FIG. 1A. Each of the plurality of femtocells 202, 204, 206 and 207 may be substantially as described with respect to FIGS. 1A and 1B. Each of the plurality of cellular enabled communication devices 208a and 208b may be substantially as described in FIG. 1A. Notwithstanding, the invention may not be so limited and the network 200 may comprise other femtocells, cellular enabled communication devices and base stations, which are not shown in FIG. 2.

The plurality of femtocells 202, 204, 206 and 207 may be communicatively coupled to an IP network via a wired connection 212. The IP network may comprise one or more network devices and/or network links operable to transmit and/or receive IP packets. The IP network may provide access to the Internet and/or one or more private networks. The wired connection 212 may comprise a broadband link such as a digital subscriber line (DSL), a T1/E1 line, a cable television infrastructure, a satellite television infrastructure, and/or a satellite broadband Internet link. The wired connection 212 may comprise one or more optical, fiber, and/or wired links.

In accordance with an embodiment of the invention, the plurality of femtocells 202, 204, 206 and 207 may be communicatively coupled via a wireless connection 213, for example. Each of the plurality of femtocells 202, 204, 206 and 207 may be a node in the network 200. Each of the plurality of femtocells 202, 204, 206 and 207 may be operable to communicate with other femtocells, base stations and/or wired enabled communication devices within a particular coverage area via a wireless connection 213. The wireless connection 213 may be enabled to communicate data wirelessly utilizing one or more wireless standards such as IS-95, CDMA, GSM, TDMA, GPRS, EDGE, UMTS/WCDMA, TD-SCDMA, OFDM, HSDPA, Bluetooth, WLAN, WiMAX, ZigBee extensions thereto, and/or variants thereof. For example, the femtocell 202 may be operable to communicate with other femtocells, base stations and/or cellular enabled communication devices within a femtocell coverage area 210*a*. The femtocell 204 may be operable to communicate with other femtocells, base stations and/or cellular enabled communication devices within a femtocell coverage area 210*b*. The femtocell 206 may be operable to communicate with other femtocells, base stations and/or cellular enabled communication devices within a femtocell coverage area 210*c*. Similarly, the femtocell 207 may be operable to communicate with other femtocells, base stations and/or cellular enabled communication devices within a femtocell coverage area 210*d*.

In accordance with an embodiment of the invention, the cellular enabled communication device 208*a* may be located within the femtocell coverage area 210*a* of femtocell 202 and within the femtocell coverage area 210*b* of femtocell 204, for example. The cellular enabled communication device 208*b* may be located within the femtocell coverage area 210*c* of femtocell 206, for example. Notwithstanding, the invention may not be so limited and the cellular enabled communication devices 208*a* and 208*b* may be located in other locations within the network 200 without limiting the scope of the invention.

In operation, the cellular enabled communication devices 208*a* and 208*b* may gain access to the cellular network 100 and/or to other communication networks via cellular communications with the base station 220 and the femtocells 202, 204 and 206. In this regard, in instances that a reliable connection may be established between the base station 220 and a cellular enabled communication device, for example, 208*a*, data may be communicated between the cellular enabled communication device 208*a* and the base station 220. Alternatively, in instances that a reliable connection may be established between a femtocell, for example, femtocell 202 and a cellular enabled communication device, for example, 208*a*, data may be communicated between the cellular enabled communication device 208*a* and the femtocell 202.

In accordance with another embodiment of the invention, the network 200 may be operable to increase the bandwidth, spectral efficiency and range of the network over a specific coverage area. For example, one or more intermediate nodes or femtocells in the network 200 may be operable to boost the signal and cooperatively make decisions to route data based on their knowledge of the network 200. Each of the plurality of femtocells 202, 204, 206 and 207 may be operable as routers to transmit and/or receive data to/from neighboring femtocells.

In accordance with another embodiment of the invention, the network 200 may be decentralized with no central server or centrally managed with a central server, for example. The femtocell 204 may be operable to transmit the received data from the femtocell 202 to the neighboring femtocell 206 within the femtocell coverage area 210*b*. The femtocell 206 may be operable to transmit the received data from the femtocell 204 to the cellular enabled communication device 208*b* within the femtocell coverage area 210*c*. Notwithstanding, the invention may not be so limited and other routes in the network 200 may be utilized to transmit data from the femtocell 202 to the cellular enabled communication device 208*b* without limiting the scope of the invention. In accordance with another embodiment of the invention, each of the plurality of femtocells 202, 204, 206 and 207 in the network 200 may be operable to detect neighboring femtocells in the network 200 without contacting the base station 220.

In accordance with another embodiment of the invention, one or more processors, for example, the processor 158 in a first of the plurality of femtocells, for example, the femtocell 202 may be operable to receive interference information from the plurality of femtocells 204, 206 and 207. The received interference information may comprise one or more of signal to noise ratio (SNR), signal to interference noise ratio (SINR), carrier to noise ratio (CNR), carrier to interference noise ratio (CINR), receive signal strength indication (RSSI), potential interference, power levels, location, and/or directionality of antennas of each of the plurality of femtocells, for example, femtocells 204, 206 and 207.

The processor 158 in the femtocell 202 may be operable to determine configuration information for each of the femtocells 202, 204, 206 and 207 based on the received interference information. The determined configuration information may comprise one or more of power levels, frequencies of operation, location, and/or directionality of antennas of each of the plurality of femtocells, for example, femtocells 202, 204, 206 and 207.

The processor 158 in the femtocell 202 may be operable to configure the femtocell 202 based on the determined configuration information. For example, the femtocell 202 may be operable to adjust one or more of its power levels, frequencies of operation, and/or directionality of antennas based on the determined configuration information.

The femtocell 202 may be operable to communicate the determined configuration information for one or more other femtocells 204, 206 and 207 to corresponding ones of the one or more other femtocells 204, 206 and 207. The one or more other femtocells 204, 206 and 207 may be operable to utilize the communicated determined configuration information to configure corresponding ones of the one or more other femtocells 204, 206 and 207. The interference between the plurality of femtocells 202, 204, 206 and 207 may be mitigated based on the configuring of the first femtocell 202 and the configuring of the corresponding ones of the one or more other femtocells 204, 206 and 207.

The processor 158 in the femtocell 202 may be operable to receive the communicated interference information and/or radio environment information from one or more communication devices, for example, cellular enabled communication devices 208*a* and 208*b*, one or more femtocells 204, 206 and 207 and/or one or more base stations 220. The communication device, for example, the cellular enabled communication devices 208*a* and 208*b* may comprise a wired and/or wireless communication device.

The interference information may be received by the femtocell 202 via a wireless connection 213. The determined configuration information may be communicated to one or more other of the plurality of femtocells, for example, femtocells 204, 206 and 207 via a wireless connection 213. The wireless connection 213 may be operable to handle signals comprising IS-95, CDMA, GSM, TDMA, GPRS, EDGE, UMTS, WCDMA, OFDM, TD-SCDMA, WiMAX, WLAN, Bluetooth, ZigBee and/or HSDPA signals.

Figure 3:
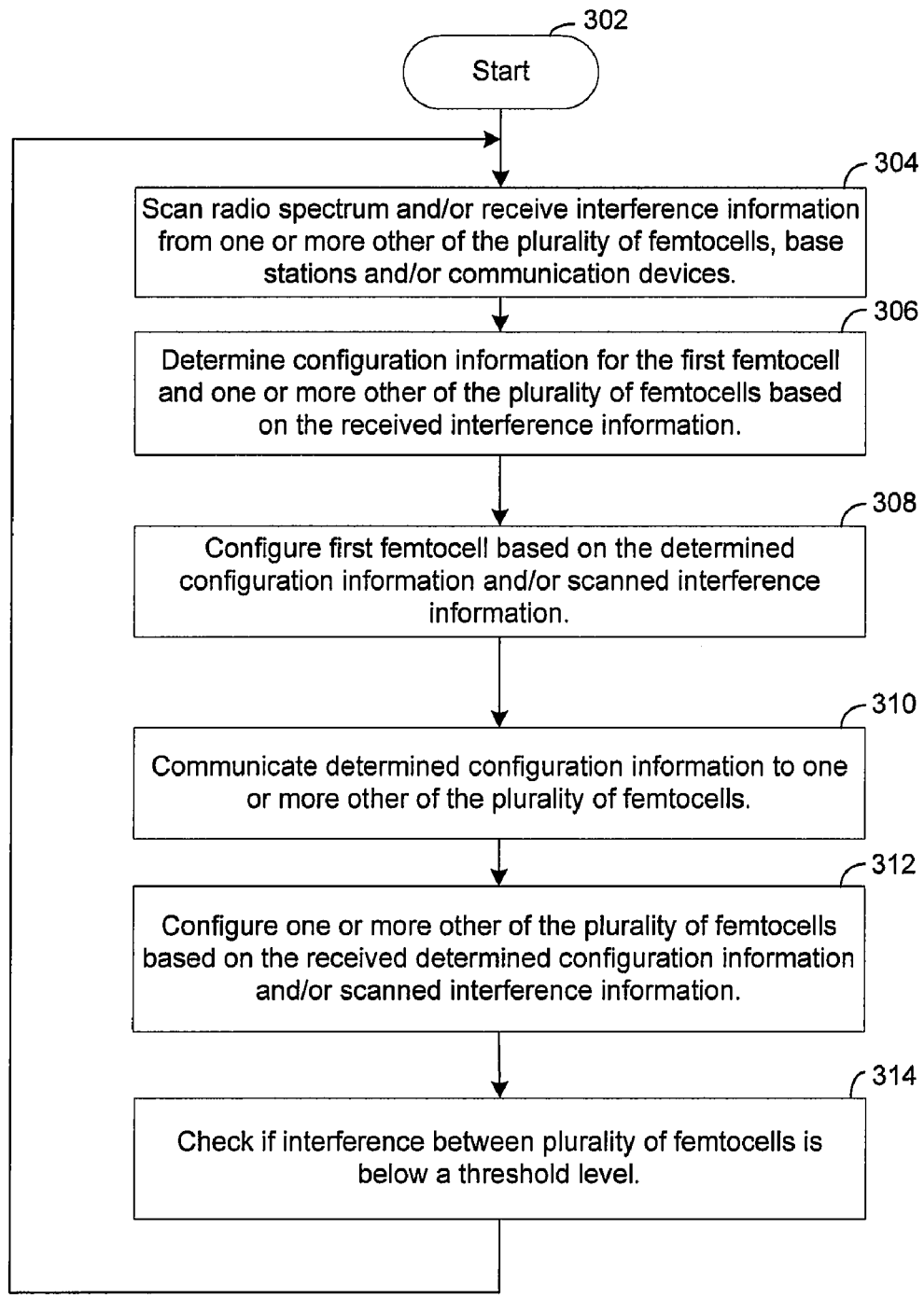
FIG. 3 is a flow chart illustrating exemplary steps for communication between a plurality of femtocells to mitigate interference between the femtocells, in accordance with an embodiment of the invention.

FIG. 3 is a flow chart illustrating exemplary steps for communication between a plurality of femtocells to mitigate interference between the femtocells, in accordance with an embodiment of the invention. Referring to FIG. 3, exemplary steps may begin with step 302. In step 304, a first of a plurality of femtocells in a network may be operable to receive interference information from one or more other of the plurality of femtocells, one or more base stations, and/or one or more communication devices. In accordance with an embodiment of the invention, the first femtocell may be operable to scan the radio spectrum to detect interference levels from one or more neighboring femtocells, one or more base stations, and/or one or more cellular enabled communication devices. The communicated interference information may comprise one or more of signal to noise ratio (SNR), signal to interference noise ratio (SINR), carrier to noise ratio (CNR), carrier to interference noise ratio (CINR), receive signal strength indication (RSSI), potential interference, power levels, and/or directionality of antennas of each of the plurality of femtocells.

In step 306, the first femtocell may be operable to determine configuration information for itself and one or more other femtocells based on the received interference information. In accordance with another embodiment of the invention, each femtocell may be operable to configure itself based on the scanned information and/or communicated interference information from other femtocells. The determined configuration information may comprise one or more of power levels, frequencies of operation, location, and/or directionality of antennas of each of the plurality of femtocells. In step 308, the first femtocell may be operable to configure itself based on the determined configuration information and/or the scanned interference information. In step 310, the first femtocell may be operable to communicate the determined configuration information for one or more other femtocells to corresponding ones of the one or more other femtocells. In step 312, the one or more other femtocells may be operable to utilize the communicated determined configuration information and/or the scanned interference information to configure corresponding ones of the one or more other femtocells. In step 314, it may be determined whether the current interference between the plurality of femtocells is below a particular interference threshold level. Control then returns to end step 304.

In accordance with an embodiment of the invention, a method and system for communication between a plurality of femtocells to mitigate interference between the femtocells may comprise a network 200 comprising a plurality of femtocells, for example, femtocells 202, 204, 206 and 207, one or more base stations 220, and/or one or more communication devices 208a and 208b. One or more processors, for example, the processor 158 for use in a first of the plurality of femtocells, for example, the femtocell 204 may be operable to receive interference information from one or more other of the plurality of femtocells, for example, the femtocells 202, 206 and 207, one or more base stations 220, and/or one or more communication devices 208a and 208b. The processor 158 may be operable to determine configuration information for the first femtocell 204 based on the received interference information. The processor 158 may be operable to configure the first femtocell 204 based on the determined configuration information.

The processor 158 in the femtocell 204 may be operable to communicate the determined configuration information for one or more other femtocells, for example, the femtocells 202, 206 and 207 to corresponding ones of the one or more other femtocells, for example, the femtocells 202, 206 and 207. In accordance with an embodiment of the invention, the femtocell 204 may be operable to scan the radio spectrum to detect interference information from one or more neighboring femtocells, for example, the femtocells 202, 206 and 207, one or more base stations 220, and/or one or more cellular enabled communication devices 208a and 208b. The one or more other femtocells, for example, the femtocells 202, 206 and 207 may be operable to utilize the communicated determined configuration information and/or scanned interference information to configure corresponding ones of the one or more other femtocells, for example, the femtocells 202, 206 and 207. The interference between the plurality of femtocells may be mitigated based on the configuring of the first femtocell 204 and the configuring of the corresponding ones of the one or more other femtocells, for example, the femtocells 202, 206 and 207.

One or more processors, for example, the processor 158 in the first femtocell 204 may be operable to receive the communicated interference information from one or more communication devices, for example, the cellular enabled communication devices 208a and 208b. The communication device, for example, the cellular enabled communication devices 208a and 208b may comprise a wired and/or wireless communication device.

The communicated interference information may comprise one or more of signal to noise ratio (SNR), signal to interference noise ratio (SINR), carrier to noise ratio (CNR), carrier to interference noise ratio (CINR), receive signal strength indication (RSSI), potential interference, power levels, multiple power levels as a function of directionality of antennas, and/or directionality of antennas of each of the plurality of femtocells, for example, the femtocells 202, 204, 206 and 207. The determined configuration information may comprise one or more of power levels, frequencies of operation, location, and/or directionality of antennas of each of the plurality of femtocells, for example, the femtocells 202, 204, 206 and 207.

The interference information may be received by the first femtocell 204 via a wireless connection 213. The processor 158 in the first femtocell 204 may be operable to communicate the determined configuration information to the one or more other femtocells, for example, the femtocells 202, 206 and 207 via a wireless connection 213. The wireless connection 213 may be operable to handle signals comprising IS-95, CDMA, GSM, TDMA, GPRS, EDGE, UMTS, WCDMA, OFDM, TD-SCDMA, Bluetooth, WLAN, WiMAX, ZigBee and/or HSDPA signals.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for communication between a plurality of femtocells to mitigate interference between the femtocells.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a)

conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for network management, comprising:
   receiving at a femtocell interference information from one or more other femtocells;
   determining configuration information comprising one or more frequencies of operation for the receiving femtocell based on said received interference information;
   configuring the receiving femtocell based on said determined configuration information;
   communicating said determined configuration information for the receiving femtocell to the one or more other femtocells, wherein the one or more other femtocells utilize the communicated determined configuration information to configure one or more other femtocells; and
   mitigating interference between the receiving femtocell and the one or more other femtocells based on said configuring of the receiving femtocell and the configuring of the one or more other femtocells.

2. The method according to claim 1, wherein said interference information comprises one or more of signal to noise ratio (SNR), signal to interference noise ratio (SINR), carrier to noise ratio (CNR), carrier to interference noise ratio (CINR), receive signal strength indication (RSSI), potential interference, power levels, and/or directionality of antennas of said receiving femtocell and said one or more other femtocells.

3. The method according to claim 1, wherein said determined configuration information comprises one or more of: power levels, said one or more frequencies of operation, location, and/or directionality of antennas of each of said plurality of femtocells.

4. The method according to claim 1, further comprising receiving said interference information from one or more base stations and/or one or more communication devices.

5. The method according to claim 1, further comprising receiving said interference information via a wireless connection.

6. The method according to claim 5, further comprising communicating said determined configuration information to said one or more other femtocells via said wireless connection.

7. The method according to claim 6, wherein said wireless connection handles signals comprising IS-95, CDMA, GSM, TDMA, GPRS, EDGE, UMTS, WCDMA, OFDM, TD-SCDMA, WiMAX, WLAN, Bluetooth, ZigBee and/or HSDPA signals.

8. The method according to claim 1, further comprising receiving said interference information from one or more communication devices.

9. The method according to claim 8, wherein said communication device comprises a wired and/or wireless communication device.

10. A system for network management, comprising:
    a processor for use in a femtocell, wherein:
    said processor is operable to receive interference information from one or more other femtocells;
    said processor is operable to determine configuration information comprising one or more frequencies of operation for said femtocell based on said received interference information;
    said processor is operable to configure said receiving femtocell based on said determined configuration information;
    said processor is operable to communicate said determined configuration information for said receiving femtocell to said one or more other femtocells;
    said one or more other femtocells are operable to utilize said communicated determined configuration information to configure said one or more other femtocells; and
    said processor is operable to mitigate interference between said receiving femtocell and said one or more other femtocells based on said configuring, of said receiving femtocell and said configuring of said one or more other femtocells.

11. The system according to claim 10, wherein said interference information comprises one or more of signal to noise ratio (SNR), signal to interference noise ratio (SINR), carrier to noise ratio (CNR), carrier to interference noise ratio (CINR), receive signal strength indication (RSSI), potential interference, power levels, and/or directionality of antennas of said receiving femtocell and said one or more other femtocells.

12. The system according to claim 10, wherein said determined configuration information comprises one or more of: power levels, frequencies of operation, location, and/or directionality of antennas of each of said receiving femtocell and said one or more other femtocells.

13. The system according to claim 10, wherein said processor is operable to receive said interference information from one or more base stations and/or one or more communication devices.

14. The system according to claim 13, wherein said processor is operable to receive said interference information via a wireless connection.

15. The system according to claim 14, wherein said processor is operable to communicate said determined configuration information to said one or more other femtocells via said wireless connection.

16. The system according to claim 15, wherein said wireless connection handles signals comprising IS-95, CDMA, GSM, TDMA, GPRS, EDGE, UMTS, WCDMA, OFDM, TD-SCDMA, WiMAX, WLAN, Bluetooth, ZigBee and/or HSDPA signals.

17. The system according to claim 10, wherein said processor is operable to receive said interference information from one or more communication devices.

18. A method for network management in a network having a plurality of femtocells, comprising:
    receiving at a first of said plurality of femtocells, interference information comprising carrier to interference noise ratio (CINR) of said plurality of femtocells, from one or more other of said plurality of femtocells;
    determining configuration information comprising one or more frequencies of operation for said first of said plurality of femtocells based on said received interference information;
    configuring said first of said plurality of femtocells based on said determined configuration information;

communicating said determined configuration information for said receiving femtocell to said one or more other of said plurality of femtocells, wherein said one or more other of said plurality of femtocells utilizes said communicated determined configuration information to configure said one or more other of said plurality of femtocells; and mitigating interference between said plurality of femtocells based on said configuring of said first of said plurality of femtocells and said configuring of said one or more other of said plurality of femtocells.

* * * * *